United States Patent [19]

Hasegawa

[11] Patent Number: 5,432,814
[45] Date of Patent: Jul. 11, 1995

[54] SPREAD SPECTRUM COMMUNICATION SYSTEM

[75] Inventor: Takaaki Hasegawa, Kawaguchi, Japan

[73] Assignee: Ricoh Company, Ltd., Tokyo, Japan

[21] Appl. No.: 185,053

[22] Filed: Jan. 24, 1994

[30] Foreign Application Priority Data

Jun. 8, 1993 [JP] Japan .................................. 5-163967

[51] Int. Cl.⁶ ............................ H04B 1/10; H04K 1/00
[52] U.S. Cl. ...................................... 375/202; 380/34; 370/18
[58] Field of Search ................. 375/1; 380/34; 370/18

[56] References Cited

U.S. PATENT DOCUMENTS

| | | | |
|---|---|---|---|
| 4,052,565 | 10/1977 | Baxter et al. | 375/1 X |
| 4,472,814 | 9/1984 | Gutleber | 375/1 X |
| 4,472,815 | 9/1984 | Gutleber | |
| 4,475,214 | 10/1984 | Gutleber | 375/1 X |
| 4,475,215 | 10/1984 | Gutleber | 375/1 X |
| 4,597,087 | 6/1986 | Kadin | 375/1 |
| 4,606,039 | 8/1986 | Nicolas et al. | 375/1 |
| 4,606,041 | 8/1986 | Kadin | 375/1 |
| 4,612,652 | 9/1986 | Kadin | 375/1 |
| 4,809,295 | 2/1989 | Zscheile, Jr. et al. | 375/1 |
| 4,930,140 | 5/1990 | Cripps et al. | 375/1 |
| 5,132,986 | 7/1992 | Endo et al. | 375/1 |
| 5,280,499 | 1/1994 | Suzuki | 375/1 |
| 5,303,258 | 4/1994 | Nakamura | 375/1 |

Primary Examiner—Bernarr E. Gregory
Attorney, Agent, or Firm—Oblon, Spivak, McClelland, Maier & Neustadt

[57] ABSTRACT

A spread spectrum communication system in which a spectrum of a communication signal is spread by using a spreading signal includes PN code generators for generating a plurality of pseudo noise codes which differ from each other, and a selector for selecting the pseudo noise codes generated by the PN code generators in accordance with a predetermined hopping pattern, the pseudo noise codes selected by the selector being used as the spreading signal.

13 Claims, 9 Drawing Sheets

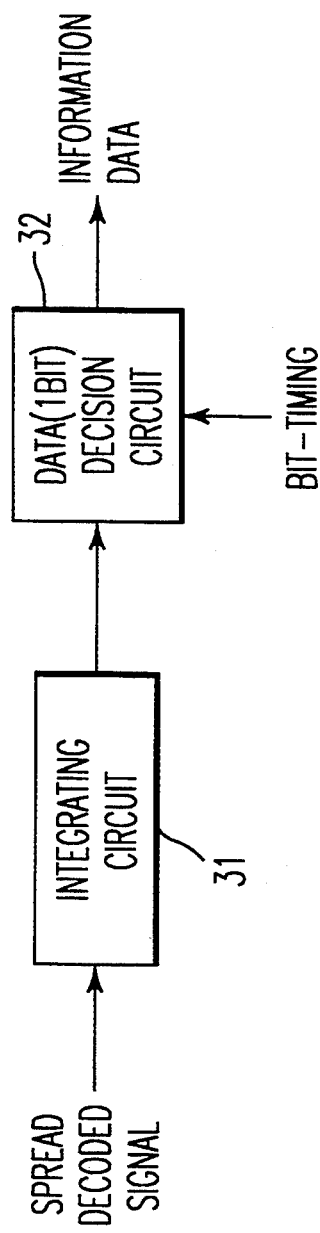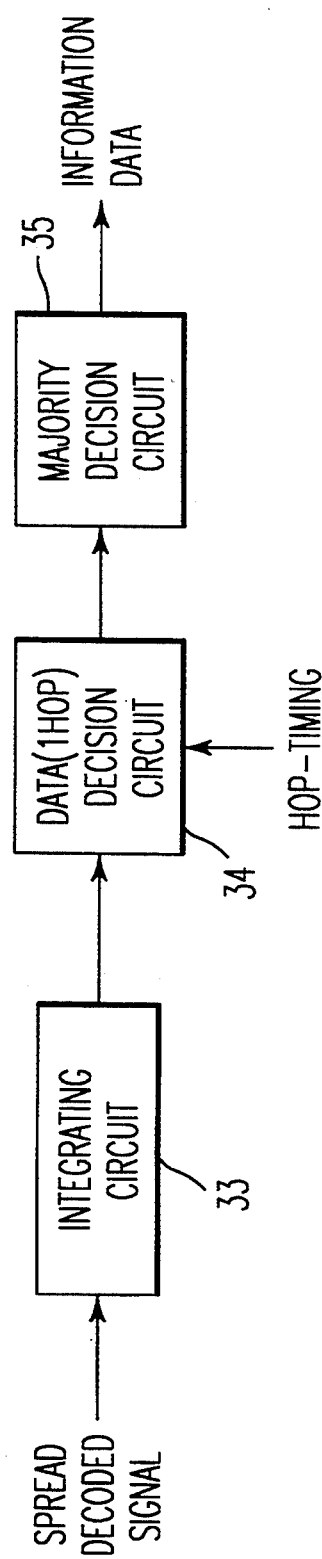

(K : NUMBER OF HOPPING CODES)

(M : DECISION RATE)

SPREAD SPECTRUM COMMUNICATION SYSTEM

BACKGROUND OF THE INVENTION

1. Field of the Invention

The present invention generally relates to a spread spectrum communication system, and more particularly to a spread spectrum communication system in which a spread spectrum is obtained by switching of a plurality of pseudo noise codes (hereinafter referred to as PN code). In the spread spectrum communication system, it is difficult to intercept communication using delayed detection, so that tolerance to single code interference is improved. The spread spectrum communication system according to the present invention is applicable to indoor radio communication, weak radio communication, and mobile radio communication.

2. Description of the Related Art

There are two types of spread spectrum communication systems: a Direct Sequence (DS) system in which a signal is multiplied by a spreading code, such as a PN code, and a Frequency Hopping (FH) system in which a carrier frequency of a narrow band signal is switched at random and discretely. These two types of spread spectrum communication systems are disclosed in "Spread Spectrum communication system" (Mitsuo Yokoyama, Kagakugijutsu Publishing Company, 1998).

The spread spectrum communication has been known as a system having superior tolerance to interruption and superior secrecy. Recently, a CDMA (Code Division Multi Access) system has been particularly known.

The DS system which is one of the spread spectrum systems has an advantage in that the system can be simply formed. However, since only a single spreading code is used, it is easy to intercept communication using the delayed detection. In addition, the spread spectrum communication system has been popularized, but there is a limit to a number of spreading codes which can be in the spread spectrum communication Thus, a spreading code used in another terminal interferes with communication. This system has a problem of the single code interference.

As has been well known, in the FH (Frequency Hopping) system, hopping of a large number of frequencies is performed. Thus, in a high-speed hopping, this system has a superior tolerance to narrow band interference. By this invention, a spread spectrum code hopping (SS/CH) system in which a large number of codes are hopped is proposed. This system is expected to have a superior tolerance to the single code interference.

As has been described above, in the DS system, since only one spreading code is used, it is easy to intercept the communication using the delayed detection. Since there is a limit to a number of kinds of spreading codes, the DS system further has a problem of single code interference by other stations in the CDMA.

In the CDMA by the FH system, if a hopping frequency hits no (becomes equal to) that in another terminal, information cannot be transmitted or is damaged.

SUMMARY OF THE INVENTION

Accordingly, a general object of the present invention is to provide a novel and useful spread spectrum communication system in which the disadvantages of the aforementioned prior art are eliminated.

A specific object of the present invention is to provide a spread spectrum communication system in which it is difficult to intercept communication using the delayed detection.

Another object of the present invention is to provide a spread spectrum communication system having superior tolerance to a code interference by other terminal.

The above objects of the present invention are achieved by a spread spectrum communication system in which a spectrum of a communication signal is spread by using a spreading signal, the system comprising: PN code generating means for generating a plurality of pseudo noise codes which differ from each other; and selecting means for selecting the pseudo noise codes generated by the PN code generating means in accordance with a predetermined hopping pattern, the pseudo noise codes selected by the selecting means being used as the spreading signal.

According to the present invention, since the spread spectrum communication is carried out by switching of a plurality of pseudo noise codes, it is difficult to intercept communication using the delayed detection. In addition, since each data item is decided based on a plurality of codes the tolerance to code interference can be improved.

Additional objects, features and advantages of the present invention will become apparent from the following detailed description when read in conjunction with the accompanying drawings.

BRIEF DESCRIPTION OF THE DRAWINGS

FIG. 4A is a block diagram illustrating an example of a data decoding unit.

FIG. 4B is a block diagram illustrating another example of a data decoding unit.

DESCRIPTION OF THE PREFERRED EMBODIMENTS

A description will now be given of embodiments of the present invention.

In the embodiments, data modulation is performed in accordance with a sequence inversion keying (SIK). A communication method according to the present invention is referred to as a spread spectrum code hopping (SS/CH) method.

The principle of a spread spectrum communication method according to the present invention will be described below in comparison with the conventional methods.

Figure 3A:
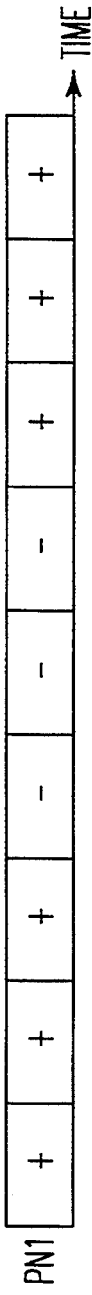
FIG. 3A is a diagram illustrating the principle of communication in the DS system.
Figure 3B:
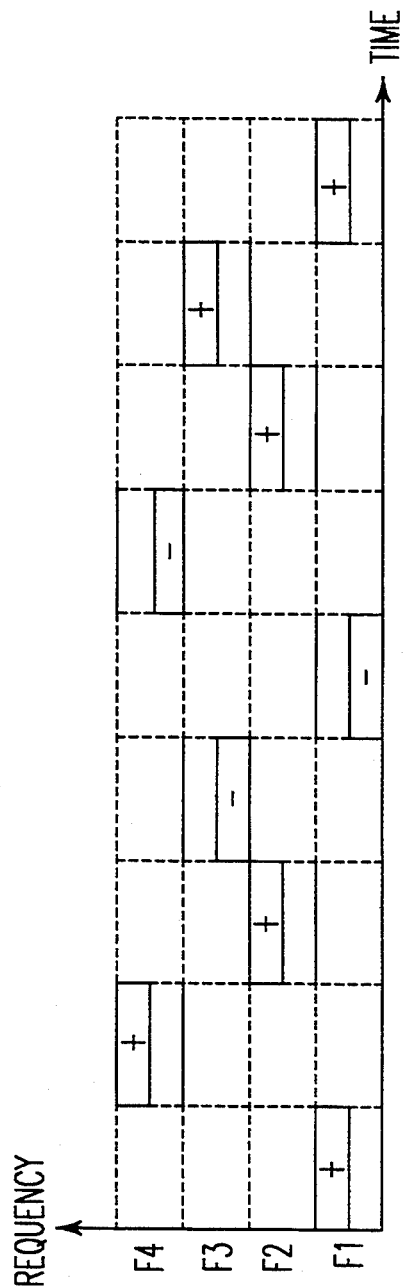
FIG. 3B is a diagram illustrating the principle of communication in the FH system.
Figure 3C:
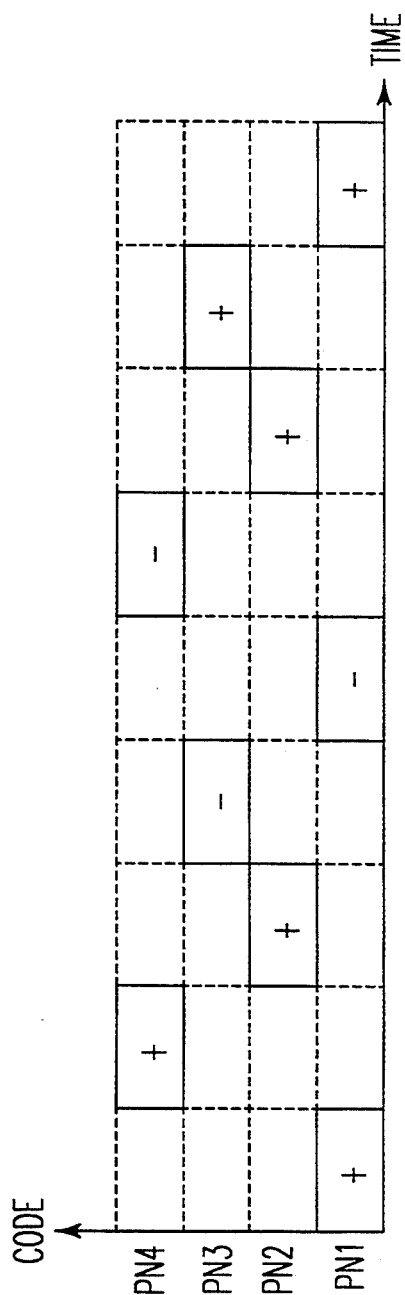
FIG. 3C is a diagram illustrating the principle of a spread spectrum communication according to the present invention.

FIG. 3A shows a direct sequence (DS) communication method, FIG. 3B shows a frequency hopping (FH) communication method and FIG. 3C shows a spread spectrum code hopping (SS/CH) communication method according to the present invention. In FIGS. 3A-3C, each square area indicates a data item transmitted in accordance with a corresponding communication method. In the communication methods shown in FIGS. 3A and 3C, the sequence inversion keying (SIK) of binary data ($\pm 1$) is carried out in a period for three codes. In the communication method shown in FIG. 3A, to compare with the above methods, the SIK is carried out once in three periods.

In the frequency hopping (FH) method shown in FIG. 3B, a primary modulation is performed in accordance with a binary frequency shift keying (BFSK), and one data item is transmitted in three times of hopping using four hopping frequencies F1, F2, F3 and F4. This frequency hopping method is referred to as a high speed FH method. According to the FH method, even if there is a narrow band interference wave, due to the majority decision, an error occurs in only in a hopping frequency affected by the narrow band interference wave and no error occurs in other hopping frequencies. Thus, the FH method has a superior tolerance to the narrow band interference.

In the spread spectrum code hopping method shown in FIG. 3C, a number (K) of hopping codes is equal to 4 (K=4), and a number (N) of times of hopping required to transmit one data item is equal to 3 (N=3). That is, one data item is transmitted in three times of hopping using four spreading codes. This method is referred to as a high speed CH method. These four codes are hopped in accordance with a predetermined hopping pattern, and information is transmitted using the SIK in the same manner as that in the DS method. One hopping frequency may be affected by an interference of a single spreading code, but other hopping frequencies are not affected by the interference. Thus, the high speed FH method has a superior tolerance to the spreading code interference. In addition, due to the difference between the number of hopping codes used in the communication and the number of times of hopping for transmission of one data item, it is very difficult to perform the delayed detection.

In a case of the multi access (CDMA), in the FH method, if a hopping frequency hits on that of another terminal, the information cannot be transmitted or is damaged. However, in the method according to the present invention, even if the hopped spreading code is equal to that of another station, information can be transmitted under a condition in which the difference between the hopping phases is equal to or greater than one chip.

Figure 1:
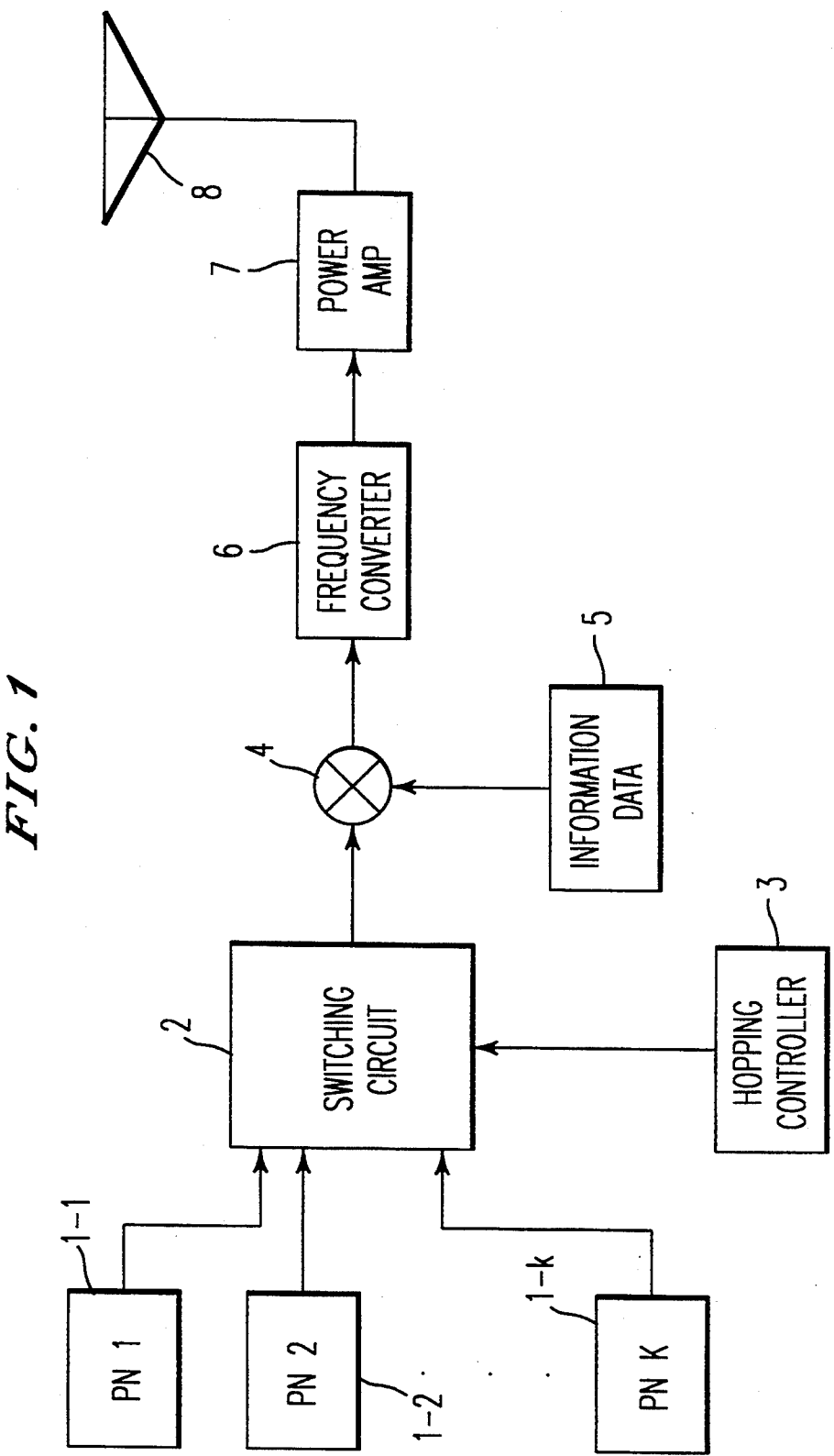
FIG. 1 is a block diagram illustrating a transmitter of a spread spectrum communication system according to a first embodiment of the present invention.
Figure 2:
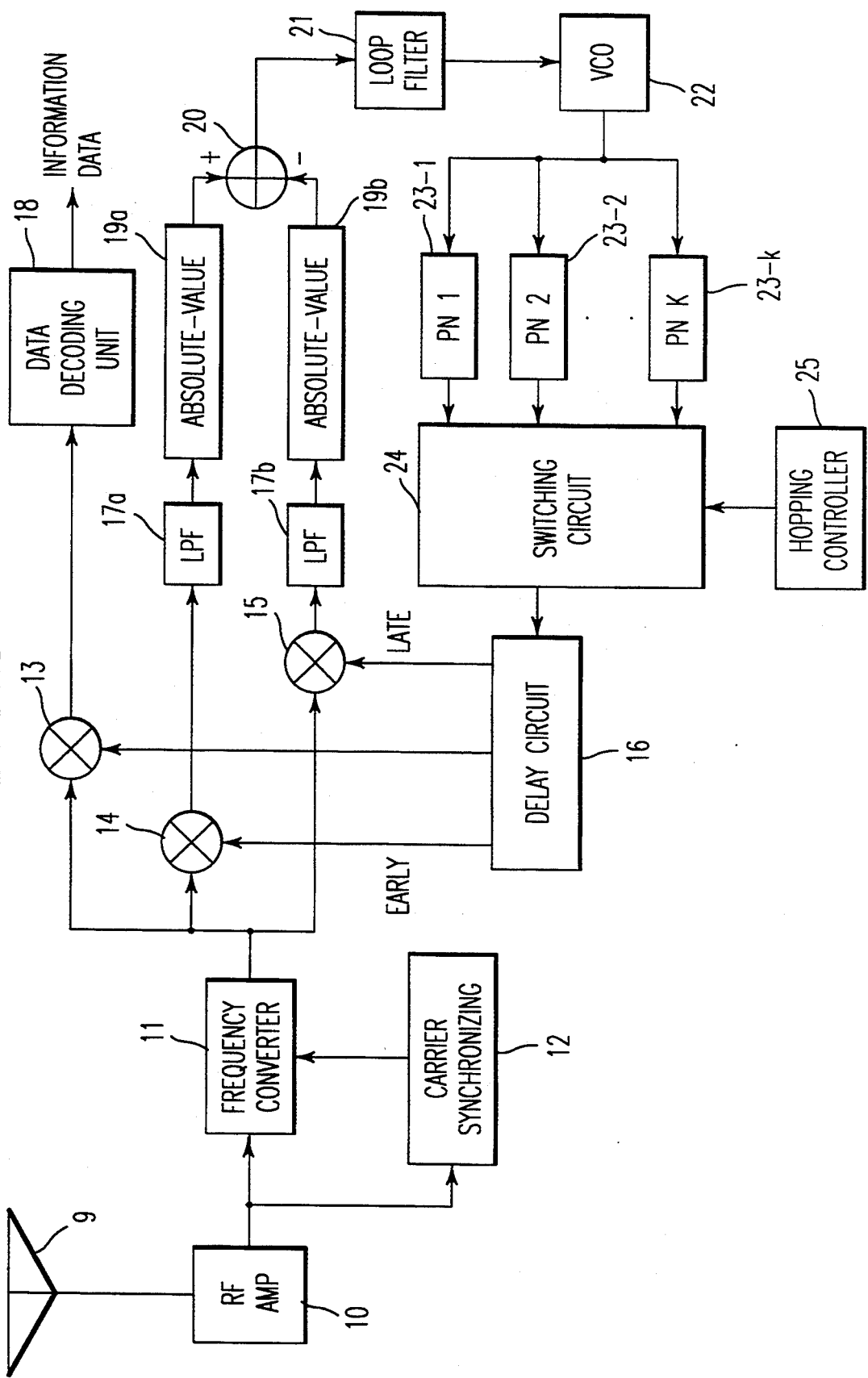
FIG. 2 is a block diagram illustrating a receiver of the spread spectrum communication system according to the first embodiment of the present invention.

FIGS. 1 and 2 respectively shows a transmitter and a receiver of a spread spectrum communication system according to a first embodiment of the present invention.

Referring to FIG. 1, the transmitter has PN generators 1-1, 1-2, ..., and 1-k, a switching circuit 2, a hopping controller 3, a multiplier 4, a data supply unit 5, a frequency converter 6, a power amplifier 7 and a transmission antenna 8. The PN generators 1-1, 1-2, ..., and 1-k generate PN signals which differ from each other. The hopping controller 3 controls the switching circuit 2 so that the PN signals output from the PN generators 1-1, 1-2, ..., and 1-k are selected in accordance with a predetermined hopping pattern. The multiplier 4 multiplies the selected PN signal output from the switching circuit 2 by data items $\pm 1$ so that the phase of the selected PN signal is inverted. That is, the information modulation is carried out in accordance with the SIK. The frequency of the modulated signal output from the multiplier 4 is converted into the frequency of the carrier, the power of the carrier is amplified by the power amplifier 7, and the radio transmission is carried out from the transmission antenna 8.

The referring to FIG. 2, the receiver has a receiving antenna 9, an RF (Radio Frequency) amplifier 10, a frequency converter 11, a carrier synchronizing unit 12, multipliers 13 -15, a delay circuit 16, low pass filter 17a and 17b, a data decoding unit 18, absolute-value circuits 19a and 19b, an adder 20, a loop filter 21, a voltage control oscillator 22, PN generators 23-1, 23-1, ..., and 23-k, a switching circuit and hopping controller 25. The receiver has a constitution in which a plurality of PN code generators 23-1, 23-2, ..., and 23-k, the switching circuit 24 and the hopping controller 25 are added to a base band delayed lock loop (DLL). Thus, a process in the base band is performed, and non-coherent DLL may be also used in the intermediate-frequency (IF).

A weak signal received by the receiving antenna 9 is amplified by the RF amplifier 10, and is then supplied to the frequency converter 11. The output signal from the RF amplifier 10 is also supplied to the carrier synchronizing unit 12. The frequency converter 11 converts an input signal into a base-band signal based on the carrier synchronizing information from the carrier synchronizing unit 12. The base band signal output from the frequency converter 11 is multiplied by the PN code, and the data coding unit 18 then performs the SIK data coding process.

The synchronization of the PN code is established by the delayed lock loop (DLL). The base band signal output from the frequency converter 11 is supplied to both the multipliers 14 and 15, and the multipliers 14 and 15 respectively multiply the base band signal by an early signal having an advanced phase and a late signal having a delayed phase. The transmitted PN signal is modulated in accordance with the SIK, so that, if the phase of the transmitted PN signal is inverted, the correlation value which is an output of the multiplier is inverted. Thus, the output signals of the multipliers 14 and 15 are respectively supplied to the absolute-value circuits 19a and 19b via the low pass filters 17a and 17b. The absolute values of the signals are obtained by the absolute-value circuits 19a and 19b. The absolute value of the signal obtained using the late signal is subtracted from the absolute value of the signal using the early signal by the adder 20. The signal output from the adder 20 is supplied to the loop filter 21, and noises are removed from the signal by the loop filter 21. The voltage control oscillator (VCO) 22 is driven based on the signal output from the loop filter 21. A clock signal output from the voltage control oscillator 22 is supplied to the respective PN signal generators 23-1, 23-2, ..., and 23-k. The PN signal generators 23-1, 23-2, ..., and 23-k, the switching circuit 24 and the hopping controller 25 are operated in the same manner as those in the transmitter shown in FIG. 1, so that the reference PN signals are hopped and synchronization with the received PN signal is established. The output signal from the switching circuit 24 is supplied to the delay circuit 16, and the delay circuit 16 outputs a standard reference PN signal, the early signal having a phase which is in advance of the phase of the standard reference PN signal, and the late signal having a phase which is later than the phase of the standard reference PN signal. The difference between the early signal and late signal is set, for example, at 1 or 2, where is a one chip time).

That is, in the transmitter, the spreading codes are switched in accordance with the predetermined hopping pattern and are transmitted, and in the receiver, the detection is performed in accordance with the active correlation or the passive correlation (matched filtering), in the same manner as that in the DS method. The case in which the delayed lock loop is used as described above is an example of the active correlation. The spreading code generators in the DLL are provided with the same spreading codes as the transmitter, and the spreading code generators are switched in an order corresponding to the hopping pattern in accordance with which the spreading signal is hopped so that the synchronization state is maintained. Data in each long period including the hopping may be stored in and read out from a memory chip by chip.

The synchronized spreading codes are generated by the DLL, and the spreading codes and the transmitted signal are multiplied together. After this, data is obtained by the correlation detection. Thus, the system can be formed of simple hardware which is almost the same as that used in the DS system.

In a receiving system operated in accordance with the passive correlation, matched filters (MF) for the spreading codes used in transmitter are provided, the matched filters are switched in every hopping patterns, and data is sampled.

FIG. 4A shows an example of the decoding unit 18 in which a sum decision of data is carried out, that is, a signal is integrated in hopping operations (e.g. three hopping operations) during a time for one data item. In FIG. 4A, the decoding unit 18 has an integrating circuit 31 and a data (1 bit) decision circuit 32. A spreading decoded signal which is inversely spread by the PN signals reproduced by the DLL is integrated by the integrating circuit 31 during a time for one data item. The data decision circuit 32 decides whether the data output from the integrating circuit 31 is +1 or −1 bit by bit. The decision result obtained in the data decision circuit 32 is output as decoded data from the decoding unit 18.

Figure 5A:
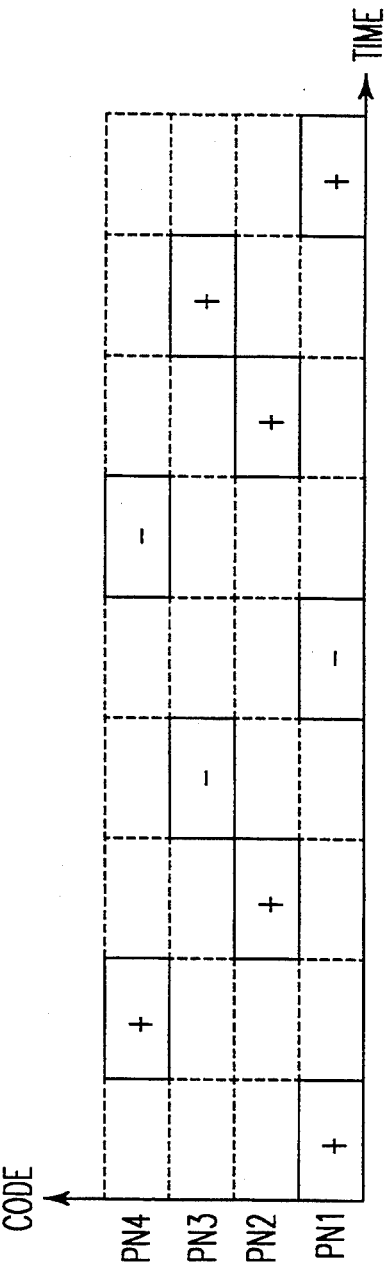
FIGS. 5A, 5B and 5C are diagrams illustrating a concept of a majority decision method.
Figure 5B:
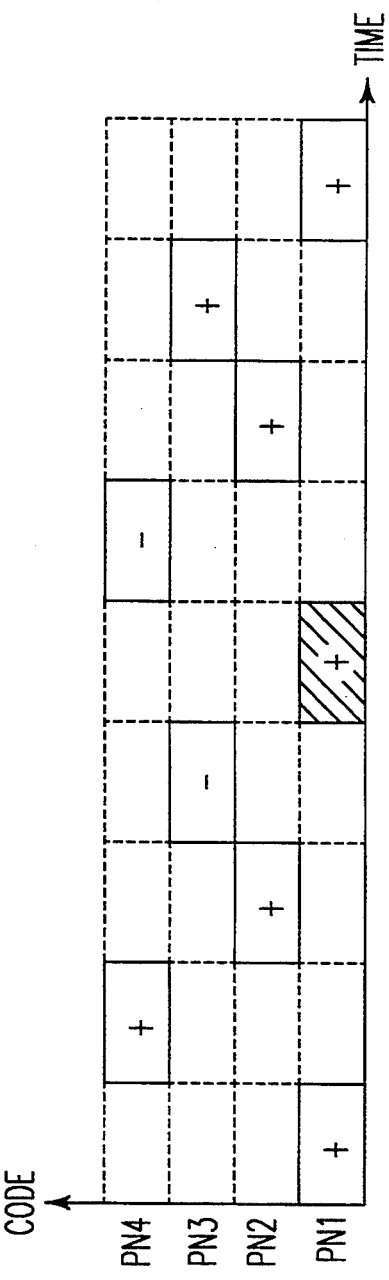
Figure 5C:
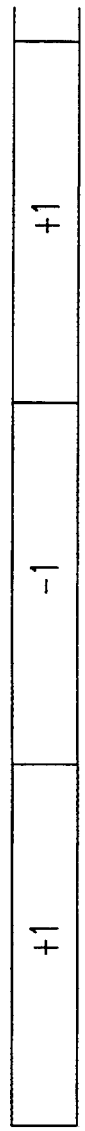

FIG. 4B shows another example of the decoding unit 18 in which a majority decision of data is carried out, that is, each data item is decided, based on decision results obtained in respective hopping operations during a time for one data item, in accordance with the majority decision. In FIG. 4B, the decoding unit 18 has an integrating circuit 33, a data (1 hopping operation) decision circuit 34 and a majority decision circuit 35. In this decoding unit 18, the data decision is performed as shown in FIGS. 5A, 5B and 5C. FIG. 5A shows transmitting data, FIG. 5B shows received data and FIG. 5C shows decided data.

It is preferable that the number of PN codes to be hopped be an odd number equal to or greater than 3. In this embodiment, one data item is transmitted by three hopping operations.

The spreading decoded signal is integrated by the integrating circuit 33 during a time for one hopping operation, and the data decision is performed in each hopping operation by the data decision circuit 34. The majority decision circuit 35 obtains a decided result having a majority from among the decided results obtained by the data decision circuit 34 and outputs it as information data. In the example shown in FIGS. 5A, 5B and 5C, a value indicated by two (the majority) of three decided results is decided as the information data. According to the decoding unit 18 in which the majority decision of data is carried out, even if there are errors in the decision results obtained in the respective hopping operations, correct data items can be obtained by the majority decision in the receiver.

In the above embodiment, the data is modulated in accordance with the SIK. Further, the primary modulation, such as the PSK or the FSK, may be carried out in the same manner that in the DS method.

In the majority decision (2:1), one bit is transmitted by continuous three spreading codes which are hopped, and a value indicated by the majority decision results among three decision results obtained in the respective hopping operations is selected.

A description will now be given of a characteristic of the spread spectrum code hopping (SS/CH) system.

Here, a consideration is given to an interference of a single spreading code and a white Gaussian noise. It is assumed that the interference code is equal to a code which is one of hopping spreading codes used for the spread spectrum process in the transmitter, and the phase and the clock frequency of the interference code are also equal to those of the one of the hopping spreading codes. This case indicates the worst case in the interference.

1-Hop-1-Data CH Method

Under conditions of the 1-hop-1-data CH method, the shift caused by the interference code is added to amplitude distribution of normal received signals in the SIK performed in the receiver. Thus, a bit error rate Pd in the DS method in which the number of hopping code is equal to 1 is represented by the following equation (1).

$$Pd = Q(\sqrt{2E_b/N_o}\ (1 + \sqrt{E_j/E_b})) + Q(\sqrt{2E_b/E_o}\ (1 - \sqrt{E_j/E_b})) \quad (1)$$

In the above equation (1), Ej is energy of interference code in each data time which a time for one bit of a desired signal, and Eb/Ej corresponds to an SIR (Signal to Interference power Ratio).

Increasing the number of hopping codes, a bit error rate Pe is represented by the following equation (2).

$$Pe = 1/K \cdot Pd + (K-1)/K \cdot Ps \quad (2)$$

In the above equation (2), Ps is a bit error rate in a case there is no code interference and signals are modulated in accordance with the SIK.

High-speed CH Method Using Majority Decision

In a case where the number (K) of the hopping codes is equal to the number (N) of hopping operations required to obtain one data item (K=N), a bit error rate Pem in the high-speed CH method using the majority decision is obtained as follows.

First, a code error rate Psm of the hopping code which is not affected by the code interference is obtained by the following equation (3).

$$Psm = Q(\sqrt{2Eb/KNo}) \qquad (3)$$

In addition, a code error rate Pdm of the hopping code which is affected by the code interference is obtained by the following equation (4).

$$Pd = Q(\sqrt{2Eb/KNo} \ (1 + \sqrt{Ej/Eb})) + \qquad (4)$$

$$Q(\sqrt{2Eb/KNo} \ (1 - \sqrt{Ej/Eb}))$$

Thus, the bit error rate Pem in the high-speed CH method using the majority decision is obtained by the following equation (5).

$$Pem = Pdm \cdot Psm^{K-1} + \qquad (5)$$

$$\sum_{i=1}^{\frac{K-1}{2}} \left[ \binom{K-1}{K-1-i} Pdm \cdot Psm^{K-1-i} \cdot (1-Psm)^i + \right.$$

$$\left. \binom{K-1}{K-i} (1-Pdm) \cdot Psm^{K-i} \cdot (1-Psm)^{i-1} \right]$$

The simulation was performed under the following conditions.

SPREADING CODE: M code sequence (code length 127)
DETECTION METHOD: coherent correlation detection
TRANSMISSION RATE: 100 (kbit/sec.)
It was assumed that the synchronization was established.

Figure 6:
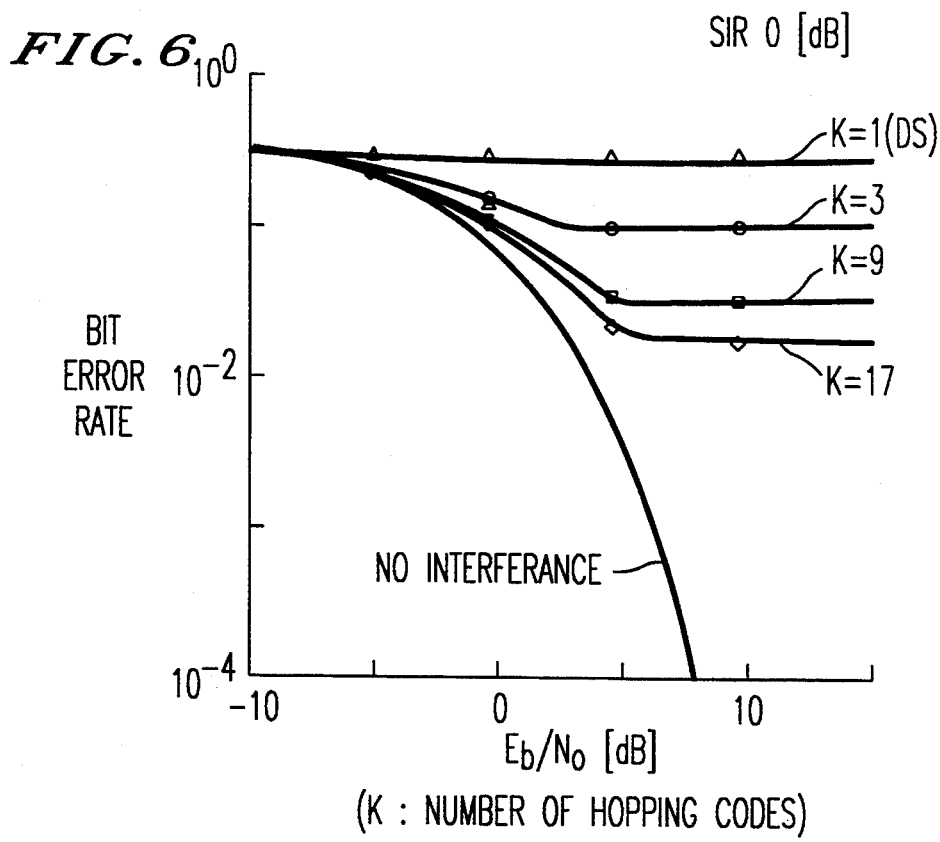
FIG. 6 is a graph illustrating an error rate in a case where a number of hopping codes in a 1-hop-1-data CH system is increased.

FIG. 6 shows variation of the bit error rate under a condition in which the number (K) of the hopping codes are varied in the 1-hop-1-bit CH method. In FIG. 6, the continuous lines indicate theoretical values obtained by the above equations. When the number of hopping codes (K) is increased, the bit error rate is improved under the single code interference.

Figure 7:
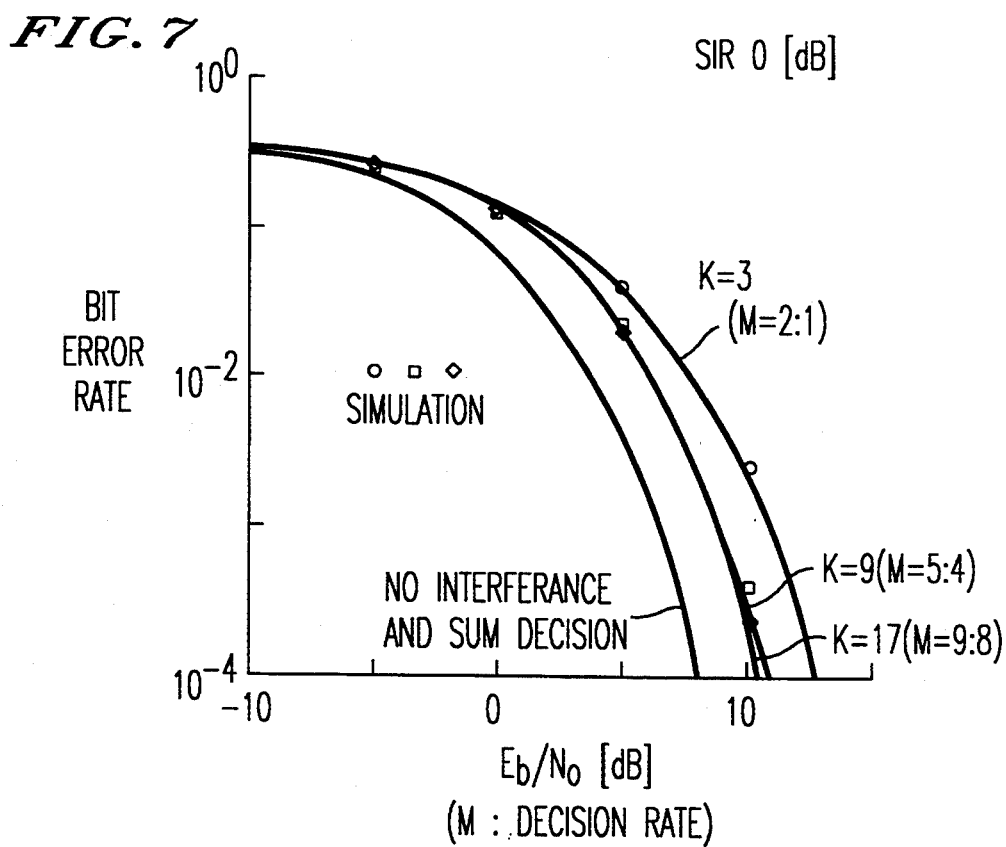
FIG. 7 is a graph illustrating an error rate in a majority decision process in a high-speed CH system.

FIG. 7 shows the bit error rate in the high-speed CH method using the majority decision. The bit error rate is clearly superior to that shown in FIG. 6. Thus, under the large single code interference, the majority decision used to decide a data item is effective in decreasing of the bit error rate in the spread spectrum code hopping (CH) method according to the present invention.

Figure 8:
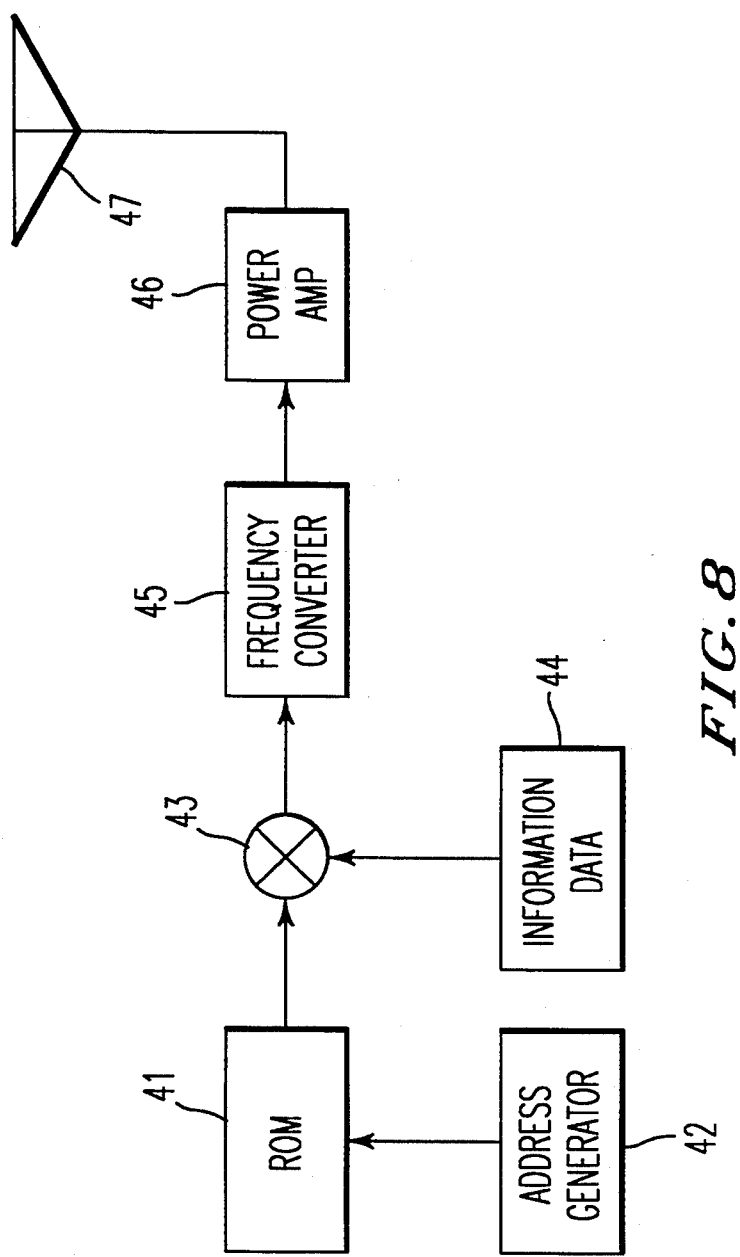
FIG. 8 is a block diagram illustrating a transmitter of a spread spectrum communication system according to a second embodiment of the present invention.
Figure 9:
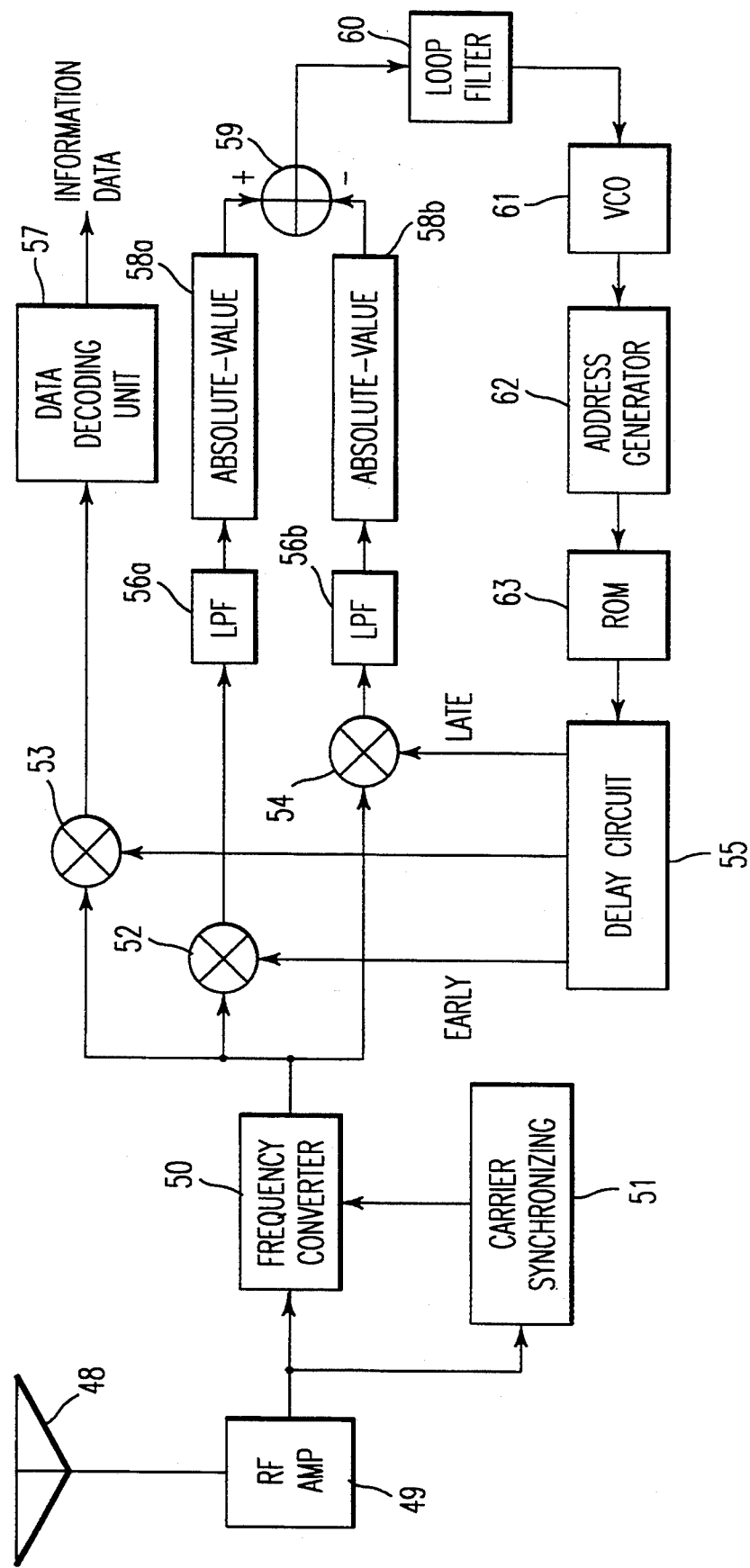
FIG. 9 is a block diagram illustrating a receiver of the spread spectrum communication system according to the second embodiment of the present invention.

FIGS. 8 and 9 respectively shows a transmitter and a receiver in the spread spectrum communication system according to a second embodiment of the present invention.

Referring to FIG. 8, the transmitter has a ROM (Read Only Memory) 41, an address generator 42, a multiplier 43, a data supply unit 44, a frequency converter 45, a power amplifier 46 and a transmission antenna 47. The transmitter in the second embodiment is provided with the ROM 41 and the address generator 42 instead of the PN signal generators 1-1, 1-2, ..., and 1-k, the switching circuit 2 and the hopping controller 3 shown in FIG. 1. That is, the codes to be hopped are stored in the ROM 42 so as to be arranged in a predetermined order corresponding to the hopping pattern, and codes are read out from the ROM 41 by supply of addresses from the address generator 42 in accordance with the predetermined order.

Referring to FIG. 9, the receiver has a receiving antenna 48, an RF amplifier 49, a frequency converter 50, a carrier synchronizing unit 51, multipliers 52, 53 and 54, a delay circuit 55, low pass filters 56a and 56b, a data decoding unit 57, absolute-value circuits 58a and 58b, an adder 59, a loop filter 60, a voltage control oscillator 61, an address generator and a ROM 63. The receiver in the second embodiment is provided with the address generator 62 and the ROM instead of the PN signal generators 23-1, 23-2, ..., and 23-k, the switching circuit 24 and the hopping controller 25 shown in FIG. 2. That is, the PN signals are read out from the ROM 63 by supply of addresses from the address generator 62 and are supplied to the delay circuit 55.

According to the second embodiment, in the transmitter and the receiver, the ROM and the address generator are substituted for the PN signal generators, the switching circuit and the hopping controller. Thus, the constructions of the transmitter and the receiver can be simplified.

Figure 10:
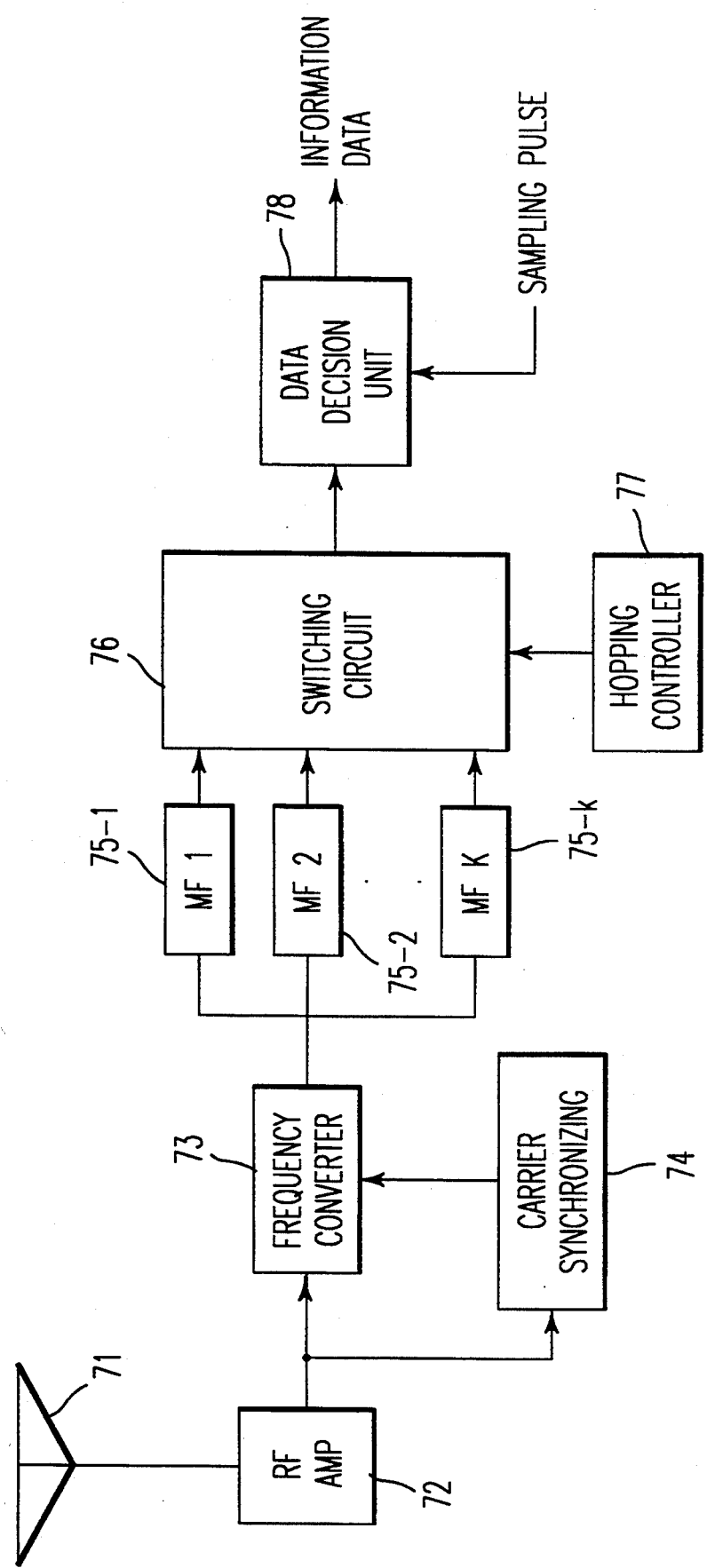
FIG. 10 is a block diagram illustrating a receiver of a spread spectrum communication system according to a third embodiment of the present invention.

FIG. 10 shows a receiver of a spread spectrum system according to a third embodiment of the present invention.

Referring to FIG. 10, the receiver has a receiving antenna 71, an RF amplifier 72, a frequency converter 73, a carrier synchronizing unit 74, matched filters (MF) 75-1, 75-2, ..., and 75-k, a switching circuit 76, a hopping controller 77 and a data decision unit 78. In this receiver, the passive synchronization is carried out by using of the matched filters 75-1, 75-2, ..., and 75-k. A signal input from the receiving antenna 71 is amplified by the RF amplifier 72, and the amplified signal is converted into the base band signal by the frequency converter 73. The base band signal is supplied to the matched filters (MF) 75-1, 75-2, ..., and 75-k. The number of matched filters is equal to the number of hopping codes transmitted by the transmitter, and each of the matched filters corresponds to one of the hopping codes. The switching circuit 76 switches outputs of the matched filters 75-1, 75-2, ... and 75-k in accordance with a pattern equal to the hopping pattern in the transmitter. A switching interval (a switching speed) of the switching circuit 76 is set to a value equal to an interval between the hopping operations. To maintain the switching interval at a constant value, the switching interval is corrected based on the timing of the correlation output every time switching operation is performed.

The initial synchronization of the hopping pattern may be established based on a timing at which a pattern switched by the switching circuit 76 becomes equal to the hopping pattern or based on an output timing of a matched filter.

In each of the matched filters 75-1, 75-1, ..., and 75-k, when a corresponding PN code is transmitted, the correlation output is obtained at an end of a period for the PN code. At this time, data is sampled by a sampling pulse in each period.

The data decision unit 78 decides information data based on a data item in each period. The data decision unit 78 may carry out the majority decision in which the number (N) of hopping operations for one data item is set at an odd number equal to or greater than 3, in the same manner as that in the first embodiment.

According to the third embodiment, the receiver has the matched filters each of which corresponds to one of the PN codes and the switching circuit for switching the matched filter in accordance with the hopping pattern, instead of the DLL (Delayed lock loop). Thus, the receiver can be simply formed.

The present invention is not limited to the aforementioned embodiments, and variations and modifications may be made without departing from the scope of the claimed invention.

What is claimed is:

1. An apparatus, comprising:
   PN code generating means for generating a plurality of pseudonoise codes which differ from each other; and
   selecting means for selecting the pseudonoise codes in accordance with a predetermined hopping pattern, the pseudonoise codes selected by said selecting means being used as a spreading signal for a spread spectrum communication device.

2. The apparatus as claimed in claim 1, wherein said selecting means comprises:
   switching means for switching the pseudonoise codes supplied from said PN generating means; and
   control means, connected to said switching means, for controlling said switching means in accordance with the predetermined hopping pattern.

3. The apparatus as claimed in claim 1, wherein said selecting means selects N pseudonoise codes from among said plurality of pseudonoise codes for each bit of information data, where N is an integer greater than 1.

4. The apparatus as claimed in claim 3 further comprising:
   first decision means for deciding a data value in each of the N pseudonoise codes and for obtaining N decision values; and
   second decision means for selecting, as the data value, a decision value which is in the majority from among the N decision value.

5. The apparatus as claimed in claim 4, wherein N is an odd number equal to or greater than 3.

6. The apparatus as claimed in claim 1, wherein said PN generating means has memory means for storing said plurality of pseudonoise codes and wherein said selecting means has means for reading out the pseudonoise codes from said memory means in accordance with the predetermined hopping pattern.

7. The apparatus claimed in claim 1, further comprising:
   a transmitter, connected to the selecting means, for transmitting a signal based on the spreading signal; and
   a receiver including:
   matched filters for processing a signal corresponding to a received signal, each of said matching filters corresponding to one of said plurality of pseudonoise codes; and
   selecting means for carrying out a switching control of said matched filters in accordance with the predetermined hopping pattern,
   wherein said received signal corresponds to said transmitted signal.

8. An apparatus according to claim 7, further comprising:
   a power amplifier connected to the mixer.

9. An apparatus according to claim 8, further comprising:
   a frequency converter, connected between the mixer and the power amplifier, for converting the frequency modulated signal output from the mixer to a signal having a frequency of a carrier.

10. An apparatus according to claim 9, further comprising:
    an antenna connected to an output of the power amplifier.

11. An apparatus as claimed in claim 1, further comprising:
    a mixer for combining the spreading signal with data items to generate a frequency modulated signal.

12. An apparatus according to claim 1, further comprising:
    receiving means for receiving a signal which is combined with one of said pseudonoise codes selected by the selecting means in order to decode the received signal.

13. An apparatus according to claim 1, wherein said selecting means comprises a hopping controller for generating said predetermined hopping pattern, said hopping controller generating the predetermined hopping pattern independent of data to be transmitted.

* * * * *